(12) United States Patent
Ki et al.

(10) Patent No.: US 8,724,685 B2
(45) Date of Patent: May 13, 2014

(54) APPARATUS AND METHOD FOR INTERFERENCE CANCELLATION IN MIMO WIRELESS COMMUNICATION SYSTEM

(75) Inventors: Young-Min Ki, Suwon-si (KR);
Byonghyo Shim, Seoul (KR);
Jong-Yoon Hwang, Yongin-si (KR);
Seung-Hwan Won, Suwon-si (KR);
Chae-Man Lim, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 236 days.

(21) Appl. No.: 13/278,487

(22) Filed: Oct. 21, 2011

(65) Prior Publication Data
US 2012/0099636 A1 Apr. 26, 2012

(30) Foreign Application Priority Data

Oct. 21, 2010 (KR) ........................ 10-2010-0103164
Apr. 26, 2011 (KR) ........................ 10-2011-0039011

(51) Int. Cl.
*H03H 7/30* (2006.01)

(52) U.S. Cl.
USPC ............ 375/229; 375/346; 375/341; 375/350

(58) Field of Classification Search
USPC .................................. 375/229, 346, 341, 350
See application file for complete search history.

(56) References Cited

U.S. PATENT DOCUMENTS

| 7,103,117 | B2 * | 9/2006 | Xu et al. ........................ 375/346 |
| 8,184,750 | B2 * | 5/2012 | Mundarath et al. ........... 375/341 |
| 8,374,298 | B2 * | 2/2013 | Kimata ........................... 375/346 |
| 2003/0076908 | A1 * | 4/2003 | Huang et al. ................... 375/350 |
| 2012/0219051 | A1 * | 8/2012 | Yin et al. ....................... 375/229 |

* cited by examiner

Primary Examiner — Eva Puente
(74) Attorney, Agent, or Firm — Jefferson IP Law, LLP

(57) ABSTRACT

An apparatus and a method for interference cancellation in a Multiple Input Multiple Output (MIMO) wireless communication system. The method for interference cancellation includes equalizing first reception signals received through two or more reception antennas to estimate transmission signals transmitted through two or more transmission antennas, generating two or more second reception signals in which a mutual interference between the transmission signals is removed from the first reception signals by using the estimated transmission signals, independently equalizing the generated two or more second reception signals, and combining the independently equalized two or more second reception signals to estimate a transmission signal in which an interference is removed.

24 Claims, 12 Drawing Sheets

APPARATUS AND METHOD FOR INTERFERENCE CANCELLATION IN MIMO WIRELESS COMMUNICATION SYSTEM

PRIORITY

This application claims the benefit under 35 U.S.C. §119 (a) to a Korean patent application filed in the Korean Industrial Property Office on Oct. 21, 2010 and assigned Serial No. 10-2010-0103164, and to a Korean patent application filed in the Korean Industrial Property Office on Apr. 26, 2011 and assigned Serial No. 10-2011-0039011, the entire disclosure of each of which is hereby incorporated by reference.

BACKGROUND OF THE INVENTION

1. Field of the Invention

The present invention relates to interference cancellation in a wireless communication system. More particularly the present invention relates to an apparatus and a method for removing interference in a Multiple Input Multiple Output (MIMO) wireless communication system.

2. Description of the Related Art

A High Speed Packet Access (HPSA) system of the 3rd Generation Partnership Project (3GPP) uses a 2×2 MIMO system of simultaneously transmitting a High-Order Modulation (HOM) of a 64-Quadrature Amplitude Modulation (QAM) and two streams.

An HSPA system uses a data channel (HS-PDSCH) having a smaller Spreading Factor (SF) in comparison with a Wideband Code Division Multiple Access (WCDMA) mobile communication system. Inter-Symbol Interference (ISI) or Inter-Cell Interference (ICI) may be efficiently suppressed for symbols having a large SF through de-spreading by a receiver. However, in a symbol having an SF of 16, it has become difficult to protect the symbol with only de-spreading. Accordingly, instead of a RAKE reception method, which has been generally used, a method of estimating a transmission signal with an equalizer is used.

While an equalizer has an advantage in that the equalizer can effectively invert a channel matrix, the equalizer also has a disadvantage in that reliability of the estimated transmission signal is lowered due to deterioration of the inversion performance when an interference signal is high. For this reason, it has become an important research issue for increasing the reception performance that equalization is performed while an interference signal is properly processed. In a CDMA system or a MIMO system using interference cancellation, technologies for performing a signal detection with the interference cancellation have been conventionally researched, but the technologies are not suitable for being applied to an HSPA system having frequency selective fading, so that an equalizer for interference cancellation is required.

SUMMARY OF THE INVENTION

Aspects of the present invention are to address the above-mentioned problems and/or disadvantages and to provide at least the advantages described below. Accordingly, an aspect of the present invention is to provide a method and an apparatus for an equalization for improving the reception performance in a Multiple Input Multiple Output (MIMO) system.

Another aspect of the present invention is to provide a method and an apparatus for removing interference in a reception signal mutually generated between independent transmission signals in a MIMO system.

Another aspect of the present invention is to provide a method and an apparatus for minimizing an approximation error generated in approximating an exponential function to a linear function in a process of cleaning an equalized symbol in a receiver of a MIMO system.

In accordance with an aspect of the present invention, a method of removing a mutual interference between transmission signals in a Multiple MIMO wireless communication system is provided. The method includes equalizing first reception signals received through two or more reception antennas to estimate transmission signals transmitted through two or more transmission antennas, generating two or more second reception signals in which a mutual interference between the transmission signals is removed from the first reception signals based on the estimated transmission signals, independently equalizing the generated two or more second reception signals, and combining the independently equalized two or more second reception signals to estimate a transmission signal in which an interference is removed.

In accordance with another aspect of the present invention, an apparatus for removing a mutual interference between transmission signals in a MIMO wireless communication system is provided. The apparatus includes an equalization unit for equalizing first reception signals received through two or more reception antennas to estimate transmission signals, and an interference cancellation signal generator for generating two or more second reception signals in which a mutual interference between transmission signals is removed from the first reception signals based on the estimated transmission signals, wherein the equalization unit independently equalizes the two or more second reception signals and combines the independently equalized two or more second reception signals to estimate a transmission signal in which an interference is removed.

Exemplary effects according to a construction of the present invention are as follows.

Aspects of the present invention generate a signal in which interference is removed from a reception signal mutually generated between independent transmission signals in a MIMO system, and equalizes the signal in which the interference is removed, so that reliability of equalization is improved and thus the reception performance may be increased. Further, an approximation error generated in approximating an exponential function to a linear function in a process of cleaning an equalized symbol in a receiver of a MIMO system may be decreased.

Further, when a reception signal includes an HS channel signal and a R99 channel signal, whether a channel signal is the HS channel signal or the R99 channel signal for each code channel may be determined, and interference may be individually processed according to the determined channel signal, which may improve the reception performance.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF THE EXEMPLARY EMBODIMENT

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a signal processing is described based on a frequency domain signal unless it is mentioned that the signal processing is for a time domain. However, the signal processing according to exemplary embodiments of the present invention may be performed in a frequency domain or a time domain.

Figure 1:
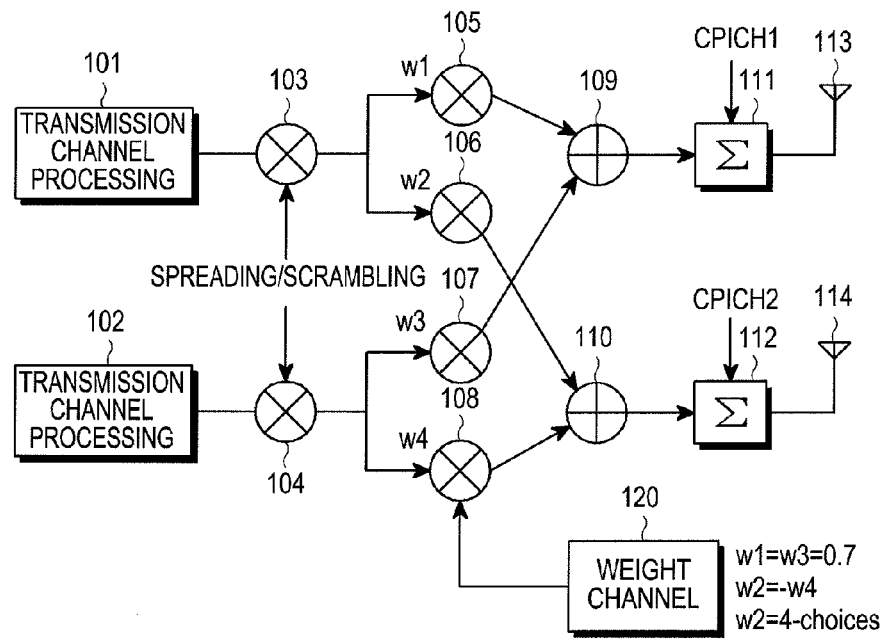
FIG. 1 is view for illustrating a structure of a 2×2 Multiple Input Multiple Output (MIMO) transmitter in a High Speed Packet Access (HSPA) system according to an exemplary embodiment of the present invention.

FIG. 1 is view for illustrating a structure of a 2×2 Multiple Input Multiple Output (MIMO) transmitter in a High Speed Packet Access (HSPA) system.

Referring to FIG. 1, the data undergoes two independent transmission channel processings 101 and 102, passes through spreading and scrambling 103 and 104, and is multiplied by weights w1, w2, w3, and w4 according to a precoding matrix at multipliers 105, 106, 107, and 108. The weights are generated in a weight channel 120, and the precoding matrix is defined by Equation 1.

$$\begin{bmatrix} w_1 & w_2 \\ w_3 & w_4 \end{bmatrix} = \begin{bmatrix} 0.7071 & 0.7071 \\ w & -w \end{bmatrix} \quad \text{Equation 1}$$

In Equation 1, w may have four different values. In a receiver, a precoding matrix having the largest energy is selected among four signals formed by combinations of a channel and all available precoding matrixes. According to an HSPA standard, the receiver transmits the selected precoding matrix to a transmitter.

Signals having passed through the precoding are added up in adders 109 and 110 in such a manner that the signals are crossed, and transmitted to a receiver via four radio channels through transmission antennas 113 and 114 after Common Pilot Channel 1 (CPICH 1) and Common Pilot Channel 2 (CPICH2) are added up in adders 111 and 112 respectively. A channel between a transmitter and a receiver and an equalization process of the receiver is described below.

Figure 2:
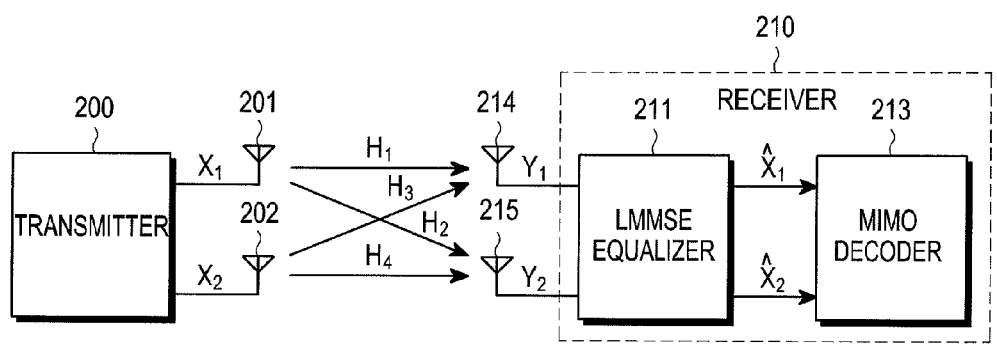
FIG. 2 is a view for illustrating a channel between a transmitter and a receiver and an equalization process of the receiver in a 2×2 MIMO transmitter in an HSPA system according to an exemplary embodiment of the present invention.

FIG. 2 is a view for illustrating a channel between a transmitter and a receiver and an equalization process of the receiver in a 2×2 MIMO transmitter in an HSPA system according to an exemplary embodiment of the present invention.

Referring to FIG. 2, X1 and X2, which are independent transmission signals output from a transmitter 200, are output through a transmission antenna #1 201 and a transmission antenna #2 202, and are transmitted to a receiver 210 through a radio channel indicated as a channel matrix H.

The channel matrix H includes H1, H2, H3, and H4. H1 refers to a channel between the transmission antenna #1 201 and a reception antenna #1 214. H2 refers to a channel between the transmission antenna #1 201 and a reception antenna #2 215. H3 refers to a channel between the transmission antenna #2 202 and the reception antenna #1 214, and H4 refers to a channel between the transmission antenna #2 202 and the reception antenna #2 215.

The receiver 210 receives signals $Y_1$ and $Y_2$ through the reception antenna #1 214 and the reception antenna #2 215, respectively, and the signals $Y_1$ and $Y_2$ are input to a receiver including an LMMSE equalizer 211 and a MIMO decoder 213.

The reception signals $Y_1$ and $Y_2$ in FIG. 2 may be represented by Equation 2 below.

$$Y_1 = H_1 X_1 + H_3 X_2 + N_1$$

$$Y_2 = H_2 X_1 + H_4 X_2 + N_2 \quad \text{Equation 2}$$

In Equation 2, $N_1$ denotes a noise signal in the reception signal $Y_1$, and $N_2$ denotes a noise signal in the reception signal $Y_2$.

Equation 3 below is an indication of a discrete-time signal of Equation 2 above.

$$y_1[n] = h_1[n] * x_1[n] + h_3[n] * x_2[n] + n_1$$

$$y_2[n] = h_2[n] * x_1[n] + h_4[n] * x_2[n] + n_2 \quad \text{Equation 3}$$

The Linear Minimum Mean Square Error (LMMSE) equalizer 211 of the receiver 210 estimates a transmission signal using cross-correlation between a reception signal and a desired signal and auto-correlation between reception signals, and outputs the estimated transmission signal.

The LMMSE equalizer 211 is designed to minimize a Mean Square Error (MSE) between a transmission signal and an output signal of the equalizer. The MSE is defined by Equation 4.

$$MSE = E[|X - \hat{X}|^2] = E[|X - WY|^2] \quad \text{Equation 4}$$

An MMSE weight satisfying the above Equation 4 is represented by a product of cross-correlation and an inverse matrix of auto-correlation as shown in Equation 5 below.

$$\hat{X} = WY = R_{xy} R_{yy}^{-1} \quad \text{Equation 5}$$

Accordingly, an output of an equalizer in a 2×2 MIMO system is represented by Equation 6 below.

$$\hat{X} = R_{xy} R_{yy}^{-1} Y \quad \text{Equation 6}$$

$$= R_{xx} H^H \begin{bmatrix} \sigma_{x1}^2 |H_1|^2 + & \sigma_{x1}^2 H_1 H_2^* + \\ \sigma_{x2}^2 |H_3|^2 + \sigma_{n1}^2 & \sigma_{x2}^2 H_3 H_4^* \\ \sigma_{x1}^2 H_2 H_1^* + & \sigma_{x1}^2 |H_2|^2 + \\ \sigma_{x2}^2 H_4 H_3^* & \sigma_{x2}^2 |H_4|^2 + \sigma_{n2}^2 \end{bmatrix}^{-1}$$

$$\begin{bmatrix} Y_1 \\ Y_2 \end{bmatrix}$$

Referring to an output of the conventional LMMSE equalizer, $$\begin{bmatrix} Y_1 \\ Y_2 \end{bmatrix}$$

is included. In $$\begin{bmatrix} Y_1 \\ Y_2 \end{bmatrix},$$

a signal of a transmission stream $X_2$ is operated as interference in an aspect of a transmission stream $X_1$, and a signal of the transmission stream $X_1$ is operated as interference in an aspect of the transmission stream $X_2$.

In the majority of cases, an interval between MIMO transmission antennas is markedly smaller in comparison with a distance between transceivers in a mobile communication environment. In this case, based on a plane wave theory, it is known that channels through which a signal output from each transmission antenna passes have only a phase difference according to an incidence angle of a plane wave, and the channels are the same. As described above, a phenomenon in which channels, through which a signal output from each transmission antenna passes, are the same may even occur in a case where correlation between reception antennas is high.

As a result, in the above environment, a channel $H_1$ and a channel $H_2$ are nearly the same, and a channel $H_3$ value and a channel $H_4$ value are nearly the same. Accordingly, the above Equation 2 may be represented by Equation 7 below.

$$\begin{bmatrix} Y_1 \\ Y_2 \end{bmatrix} = \begin{bmatrix} H_1 & H_3 \\ H_1 + \varepsilon_1 & H_3 + \varepsilon_2 \end{bmatrix} \begin{bmatrix} X_1 \\ X_2 \end{bmatrix} + \begin{bmatrix} N_1 \\ N_2 \end{bmatrix} \quad \text{Equation 7}$$

Under an environment where the channel $H_1$ and the channel $H_2$ are nearly the same and the channel $H_3$ and the channel $H_4$ are nearly the same, an inversion of auto-correlation of the LMMSE has a large error, and accordingly an error rate of an output signal of an equalization using the MISE is also increased. Accordingly, when there is a mutual interference between transmission signals, an output signal of an LMMSE equalizer has a larger error in transmission signal estimation in comparison with a case where there is no mutual interference.

Figure 3:
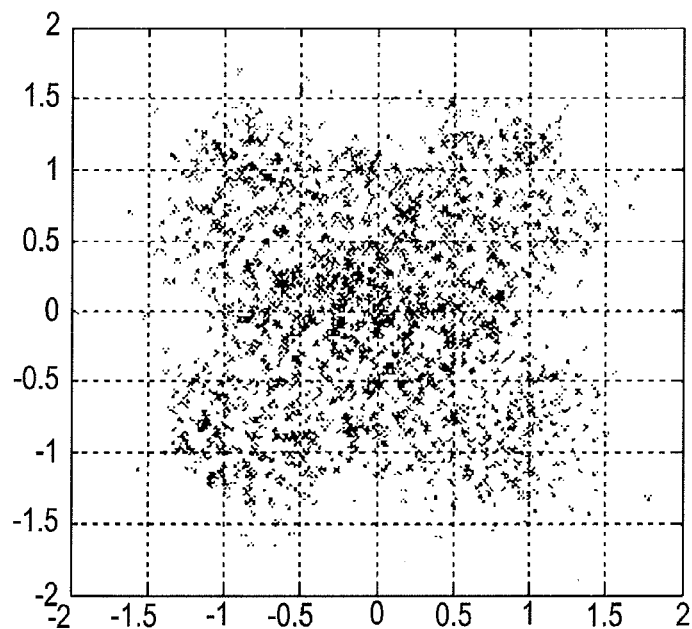
FIG. 3 is a scatter plot illustrating an output of a Linear Minimum Mean Square Error (LMMSE) equalizer when there is a mutual interference between transmission signals according to an exemplary embodiment of the present invention.
Figure 4:
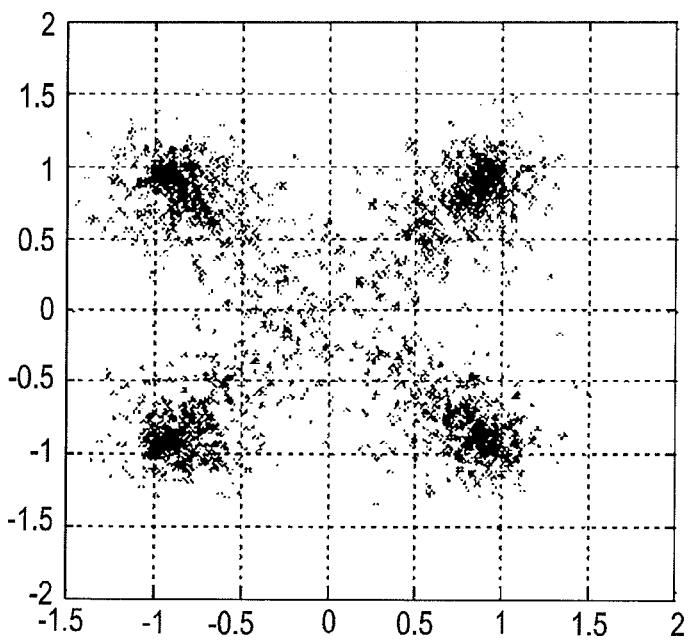
FIG. 4 is a scatter plot illustrating an output of an LMMSE equalizer when there is no mutual interference between transmission signals according to an exemplary embodiment of the present invention.

FIG. 3 is a scatter plot illustrating an output of an LMMSE equalizer when there is a mutual interference between transmission signals according to an exemplary embodiment of the present invention, and FIG. 4 is a scatter plot illustrating an output of an LMMSE equalizer when there is no mutual interference between transmission signals according to an exemplary embodiment of the present invention.

Referring to FIGS. 3 and 4, FIG. 4 has a smaller error in transmission signal estimation in comparison with FIG. 3. Accordingly, an inter-stream interference should be removed or reduced in order to decrease an error rate of the output of the LMMSE equalizer.

First Exemplary Embodiment

A first exemplary embodiment of the present invention generates a reception signal in which a mutual interference is removed and uses the generated reception signal in equalization. A basic concept of the first exemplary embodiment of the present invention will be briefly described.

The first exemplary embodiment of the present invention equalizes a reception signal to estimate a transmission signal in Equation 7, and generates a plurality of reception signals in which interference is removed from the reception signal. The first exemplary embodiment independently equalizes the plurality of reception signals in which the interference is removed, and combines the reception signals to estimate a transmission signal in which the interference is removed. A transmission signal having high reliability may be estimated and a diversity gain may be simultaneously obtained by using a method of generating reception signals, in which an interference is removed, and equalizing the reception signals to add them. As the above process is repeatedly performed, the quality of a reception signal may be further improved.

Exemplary embodiments of the present invention are described based on a 2×2 MIMO transmission/reception system as an example, but it is only for convenience of description. Exemplary embodiments of the present invention may be identically applied to other multiple transmission/reception systems other than the 2×2 MIMO transmission/reception system.

Figure 5:
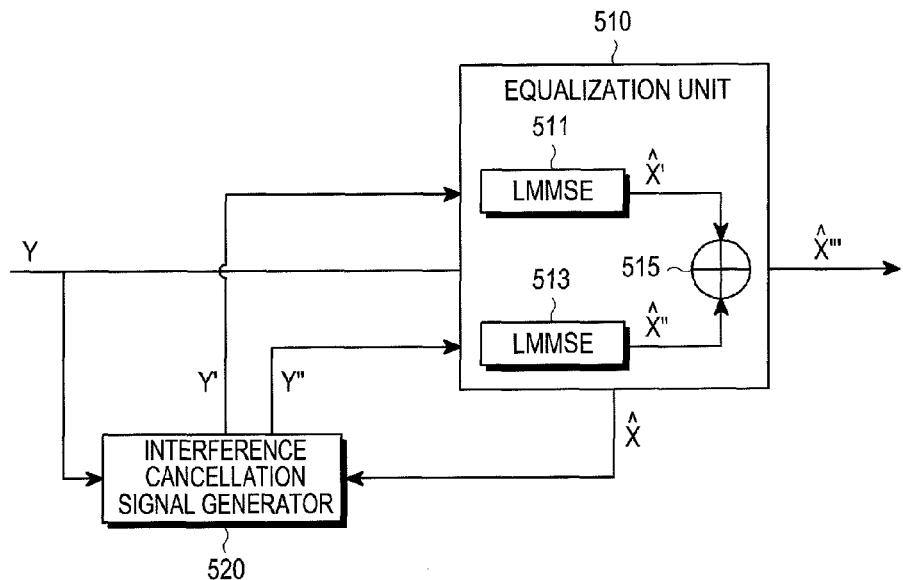
FIG. 5 is a view for describing a construction of an LMMSE equalizer in a receiver of a 2×2 MIMO transmission/reception system according to a first exemplary embodiment of the present invention.

FIG. 5 is a view for describing a construction of an LMMSE equalizer in a receiver of a 2×2 MIMO transmission/reception system according to a first exemplary embodiment of the present invention.

Referring to FIG. 5, an equalizer according to the present invention includes an equalization unit 510 and an interference cancellation signal generator 520. In FIG. 5, an input signal Y includes received signals of $(Y_1, Y_2)$ from two antennas. Outputs Y' and Y" of the interference cancellation signal generator 520 include $(Y_1', Y_2')$ and $(Y_1'', Y_2'')$, respectively. Outputs $\hat{X}'$ and $\hat{X}''$ of a first LMMSE equalizer 511 and a second LMMSE equalizer 513 include and $(\hat{X}_1', \hat{X}_2')$, respectively.

The reception signal Y is input to the equalizer 510 and the interference cancellation signal generator 520.

The equalizer 510 equalizes the reception signal Y using one of the first LMMSE equalizer 511 and a second LMMSE equalizer 513 to estimate a transmission signal, and transfers the estimated transmission signal $\hat{X}$ to the interference cancellation signal generator 520.

The interference cancellation signal generator 520 generates signals Y' and Y", in which a mutual interference between transmission signals generated in different antennas is removed from the reception signal Y, using the estimated transmission signal $\hat{X}$. Y' and Y" are input to the equalizer 510 and independently equalized in each of the first LMMSE equalizer 511 and the second LMMSE equalizer 513. As a result, $\hat{X}'$ and $\hat{X}''$ are output.

$\hat{X}'$ and $\hat{X}''$ are linearly added in an adder 515 and $\hat{X}'''$ is output. $\hat{X}'''$ refers to a finally estimated transmission signal. As described above, in the first embodiment of the present invention, the plurality of reception signals, in which a mutual interference between transmission signals is removed, are generated, the reception signals are independently equalized, the equalized signals are linearly added, and $\hat{X}'''$ is output. As a result, an output of the equalizer, that is, reliability of the estimated transmission signal may be increased. When $\hat{X}'''$ is input to the interference cancellation signal generator 520 again and the above processes are repeated, reliability of the estimated transmission signal is further increased.

Y' is defined by Equation 8 below, and Y" is defined by Equation 9 below.

$$Y_1' = H_1 X_1 + H_3 (X_2 - \hat{X}_2) + N_1$$

$$Y_2' = H_2 (X_1 - \hat{X}_1) + H_4 X_2 + N_2 \quad \text{Equation 8}$$

$$Y_2'' = H_1 (X_1 - \hat{X}_1) + H_3 X_2 + N_1$$

$$Y_2' = H_2 X_1 + H_4 (X_2 - \hat{X}_2) + N_2 \quad \text{Equation 9}$$

Since the transmission signal estimated in the LMMSE is represented as an attenuation type of the original transmission signal, the above Equations 8 and 9 are represented by Equation 10 again in an indication of a matrix-vector model.

$$Y' \begin{bmatrix} H_1 & \varepsilon H_2 \\ \varepsilon H_3 & H_4 \end{bmatrix} X + N \quad \text{Equation 10}$$

$$Y'' = \begin{bmatrix} \varepsilon H_1 & H_2 \\ H_3 & \varepsilon H_4 \end{bmatrix} X + N$$

In an indication of Equation 10, it should be noted that attenuation of the channel matrix is substituted for attenuation of the transmission signal. If a filter coefficient of an equalizer after the interference is removed is redesigned according to Equation 10, the performance of the equalizer may be improved.

A result of equalizing Y' and a result of equalizing Y" are represented based on Equation 11 below. In a result of equalizing Y', Y is substituted for Y, $Y_1'$ is substituted for $Y_1$, $Y_2'$ is substituted for $Y_2$, $\hat{X}'$ is substituted for $\hat{X}$, Y" is substituted for Y, $Y_1''$ is substituted for $Y_1$, $Y_2''$ is substituted for $Y_2$, and $\hat{X}''$ is substituted for $\hat{X}$ in Equation 11 below.

$$\hat{X} = R_{xy} R_{yy}^{-1} Y \quad \text{Equation 11}$$

$$= R_{xx} H'^H \begin{bmatrix} \sigma_{x1}^2 |H_1|^2 + & \varepsilon \sigma_{x1}^2 H_1 H_2^* + \\ \varepsilon \sigma_{x2}^2 |H_3|^2 + \sigma_{n1}^2 & \varepsilon \sigma_{x1}^2 H_1 H_2^* + \varepsilon \sigma_{x2}^2 H_3 H_4^* \\ \varepsilon \sigma_{x1}^2 H_2 H_1^* + & \varepsilon \sigma_{x1}^2 |H_2|^2 + \\ \varepsilon \sigma_{x2}^2 H_4 H_3^* & \sigma_{x2}^2 |H_4|^2 + \sigma_{n2}^2 \end{bmatrix}^{-1}$$

$$\begin{bmatrix} Y_1 \\ Y_2 \end{bmatrix}$$

Figure 6:
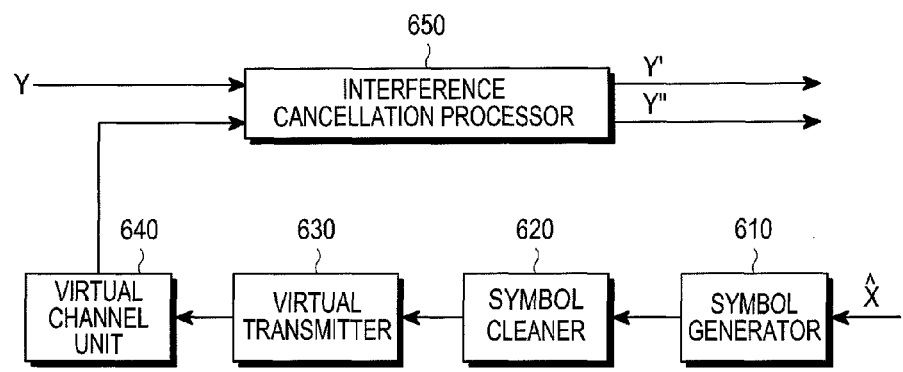
FIG. 6 is a view for describing a construction of an interference cancellation signal generator according to an exemplary embodiment of the present invention.

FIG. 6 is a view for describing a construction of an interference cancellation signal generator according to an exemplary embodiment of the present invention.

The interference cancellation signal generator 520 includes a symbol generator 610, a symbol cleaner 620, a virtual transmitter 630, a virtual channel unit 640, and an interference cancellation processor 650.

The symbol generator 610 generates a symbol from the estimated transmission signal $\hat{X}$ transferred from the equalization unit 510. The symbol generator 610 applies an inverse process of the signal processing procedure of the transmitter described in FIG. 1 to $\hat{X}$ in order to generate a symbol. After multiplying $\hat{X}$ and an inverse precoding matrix, the symbol generator 610 performs inverse scrambling and inverse spreading to generate the symbol. For example, the inverse spreading may be performed through an inverse Hadamard conversion, and the inverse scrambling may be performed by multiplying a PN code.

The symbol generated in the symbol generator 610 is created by adding a noise v after multiplying a gain g and a symbol s, and is defined by Equation 12.

$$r = gs + v \quad \text{Equation 12}$$

The symbol cleaner 620 performs a symbol cleaning for the generated symbol, so that a more reliable symbol may be generated in comparison with the symbol generated in the symbol generator 610. The first exemplary embodiment of the present invention proposes a method of efficiently performing the symbol cleaning. The symbol cleaning is described below with reference to FIG. 9.

The virtual transmitter 630 applies the signal processing procedure of the transmitter of FIG. 1 to the symbol in which the cleaning is performed. After the spreading and the scrambling are performed for the symbol, a precoding matrix is multiplied. For example, the spreading may be performed through an inverse Hadamard conversion, and the scrambling may be performed by multiplying a PN code.

The virtual channel unit 640 multiplies an output signal of the virtual transmitter 630 and a channel function in order to enable the output signal of the virtual transmitter 630 to experience a channel H between the transmitter 200 and the receiver 210. If the signal is processed in a time domain, a convolution of the channel function will be performed.

The interference cancellation processor 650 outputs Y' of Equation 8 and Y" of Equation 9 from the reception signal Y using the output signal of the virtual channel unit 640, and generates reception signals having a high reliability in which a mutual interference between transmission signals is removed. As described in FIG. 5, Y' and Y" are input to the equalization unit 510, independently equalized, linearly added, and $\hat{X}'''$ are generated.

The symbol generator 610, the symbol cleaner 620, and the virtual transmitter 630 enable the reliability of the transmission signal $\hat{X}$, which is equalized in the equalizer 510 to be estimated, to be further improved. Accordingly, the elements 610, 620, and 630 may be omitted for reducing complexity of the system. In this case, the signal input to the virtual channel unit 640 will be the signal $\hat{X}$ output after the reception signal Y is equalized in the equalizer 510.

Figure 7:
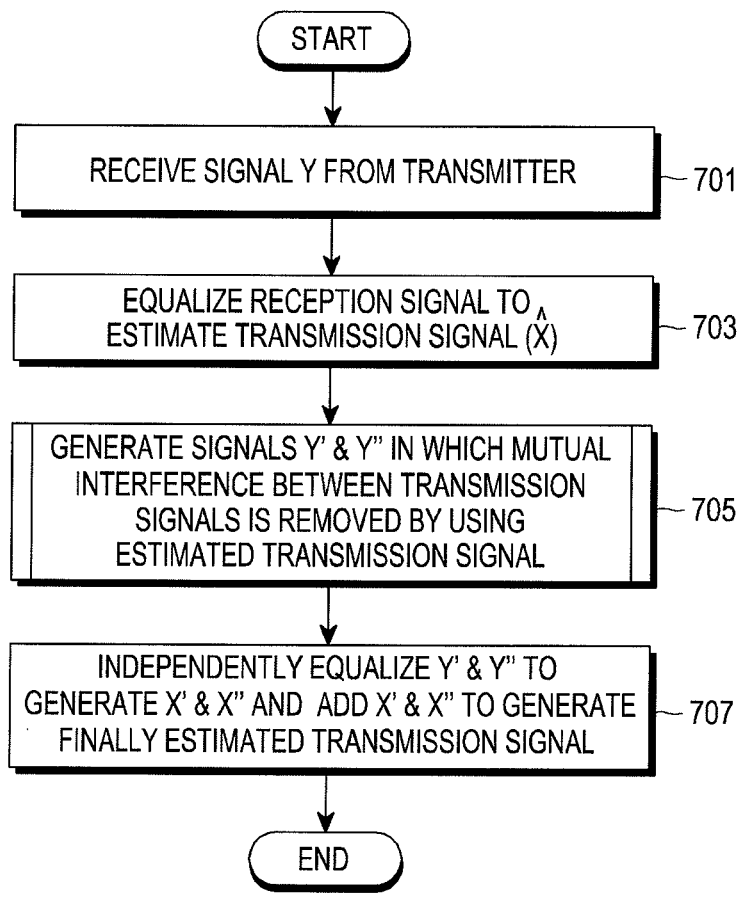
FIG. 7 is a view for describing an equalization method in a receiver according to the first exemplary embodiment of the present invention.

FIG. 7 is a view for describing an equalization method in a receiver according to the first exemplary embodiment of the present invention.

Referring to FIG. 7, when the receiver receives the signal Y transmitted from the transmitter in step 701, the equalizer 510 equalizes the reception signal and estimates the transmission signal to output $\hat{X}$ in step 703.

In step 705, the interference cancellation signal generator 520 generates the reception signals Y' and Y", in which a mutual interference between transmission signals is removed, by using the estimated transmission signal. In step 707, the equalizer 510 independently equalizes Y' and Y" to output $\hat{X}'$ and $\hat{X}''$, and linearly adds $\hat{X}'$ and $\hat{X}''$ to output a finally estimated transmission signal $\hat{X}'''$.

Figure 8:
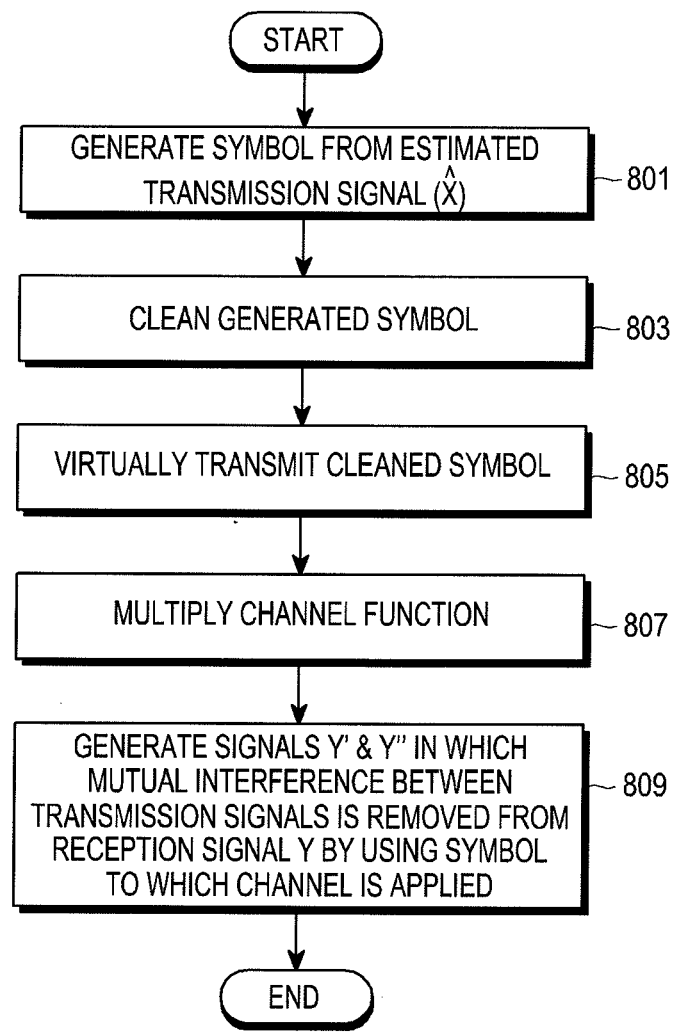
FIG. 8 is a view for describing step 705 of FIG. 7 according to an exemplary embodiment of the present invention.

FIG. 8 is a view for describing step 705 of FIG. 7 according to an exemplary embodiment of the present invention.

Referring to FIG. 8, in step 801, the symbol generator 610 generates a symbol from the estimated transmission signal $\hat{X}$ transferred from the interference cancellation signal generator 520. The symbol generator 610 applies the inverse procedure of the signal processing procedure of the transmitter described in FIG. 1 to $\hat{X}$ in order to generate a symbol. After multiplying $\hat{X}$ and an inverse precoding matrix, the symbol generator 610 performs inverse scrambling and inverse spreading to generate the symbol. For example, the inverse spreading may be performed through an inverse Hadamard conversion, and the inverse scrambling may be performed by multiplying a PN code.

In step 803, the symbol cleaner 620 performs a symbol cleaning for the generated symbol, so that a more reliable symbol may be generated in comparison with the symbol generated in the symbol generator 610. The first exemplary embodiment of the present invention proposes a method of efficiently performing the symbol cleaning. The symbol cleaning is described below with reference to FIG. 9.

In step 805, the virtual transmitter 630 applies the signal processing procedure of the transmitter of FIG. 1 to the symbol in which the cleaning is performed. After the spreading and the scrambling are performed for the symbol, a precoding matrix is multiplied. For example, the spreading may be performed through an inverse Hadamard conversion, and the scrambling may be performed by multiplying a PN code.

In step 807, the virtual channel unit 640 multiplies an output signal of the virtual transmitter 630 and a channel function and applies the channel in order to enable the output signal of the virtual transmitter 630 to experience a channel H between the transmitter 200 and the receiver 210.

In step 809, signals Y' and Y", in which a mutual interference between transmission signals is removed, are generated using the symbol to which the channel is applied.

Steps 801 to 805 enable the reliability of the transmission signal $\hat{X}$, which is equalized in the equalizer 510 to be estimated, to be further improved. Accordingly, steps 801 to 805 may be omitted for reducing complexity of the system. In this case, the virtual channel unit 640 multiplies the transmission signal $\hat{X}$ estimated after the reception signal Y is equalized in the equalizer 510 and a channel function in step 807. If the signal is processed in a time domain, a convolution of the channel function will be performed.

The symbol cleaning method proposed in the first exemplary embodiment of the present invention, which is mentioned with reference to FIG. 6, is described below.

Generally, a symbol cleaning is referred to as a soft slicing, and hereinafter, these terms may be used interchangeably. As the soft slicing method, a linear MMSE method and a general (non-linear) MMSE method are used.

A result of the soft slicing using the linear MMSE method is known as defined by Equation 13, and a result of the soft slicing using the non-linear MMSE method is known as defined by Equation 14.

$$\hat{d} = Fy = R_{xy}R_{yy}^{-1}y = \frac{g}{g^2 + \sigma^2}r \qquad \text{Equation 13}$$

$$\hat{d} = E[d \mid y] \qquad \text{Equation 14}$$
$$= \sum_s gsP(s \mid y)$$
$$= g\sum_d s\frac{P(y \mid s)P(s)}{P(y)}$$
$$= g\frac{\sum_s sP(y \mid s)P(s)}{\sum_s P(y \mid s)P(s)}$$

Equation 14 may be defined by Equation 15 below through a rearrangement.

$$\hat{d} = g\frac{\sum_s s\exp\left(-\frac{|y-gs|^2}{\sigma^2}\right)}{\sum_s \exp\left(-\frac{|y-gs|^2}{\sigma^2}\right)} \qquad \text{Equation 15}$$

Referring to Equation 15, an exponential function is used to implement the soft slicing using the non-linear MMSE method. However, there is a problem in that it is very complicated to implement the exponential function through hardware. Accordingly, exemplary embodiments of the present invention propose a method of approximating the exponential function to a piecewise linear function which is easy to be implemented through hardware.

The reason why the symbol cleaning, that is, the soft slicing is performed is to further increase the reliability of the symbol generated in the symbol generator 610. The non-linear MMSE method may be indicated by a linear combination of all constellation points on the constellation. Contributions affecting result values are different from each other according to a location of a reception symbol on the constellation.

Figure 9:
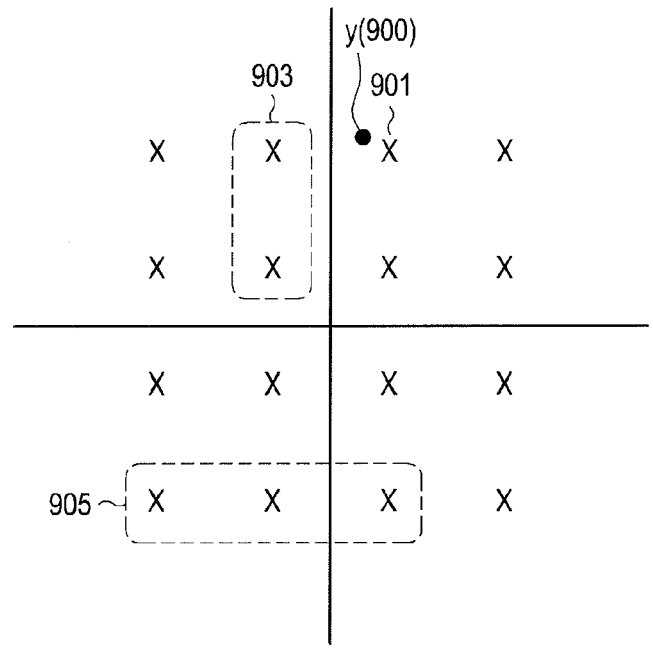
FIG. 9 is a view for describing contribution for a nonlinear MMSE estimation value of each constellation point in a constellation of a 16-QAM modulation manner according to an exemplary embodiment of the present invention.

FIG. 9 is a view for describing a contribution for a non-linear MMSE estimation value of each constellation point in a constellation of a 16-QAM modulation manner according to an exemplary embodiment of the present invention.

Referring to FIG. 9, a contribution for a non-linear MMSE estimation value of each constellation point becomes higher in the constellation of a 16-QAM modulation method as the constellation point becomes closer to a reception signal y 900 of a time domain, and the contribution becomes lower as the constellation point becomes farther from the reception signal y 900. In FIG. 9, a constellation point 901 has the highest contribution, constellation points 903 have the second highest contribution, and constellation points 905 have a low contribution.

Figure 10:
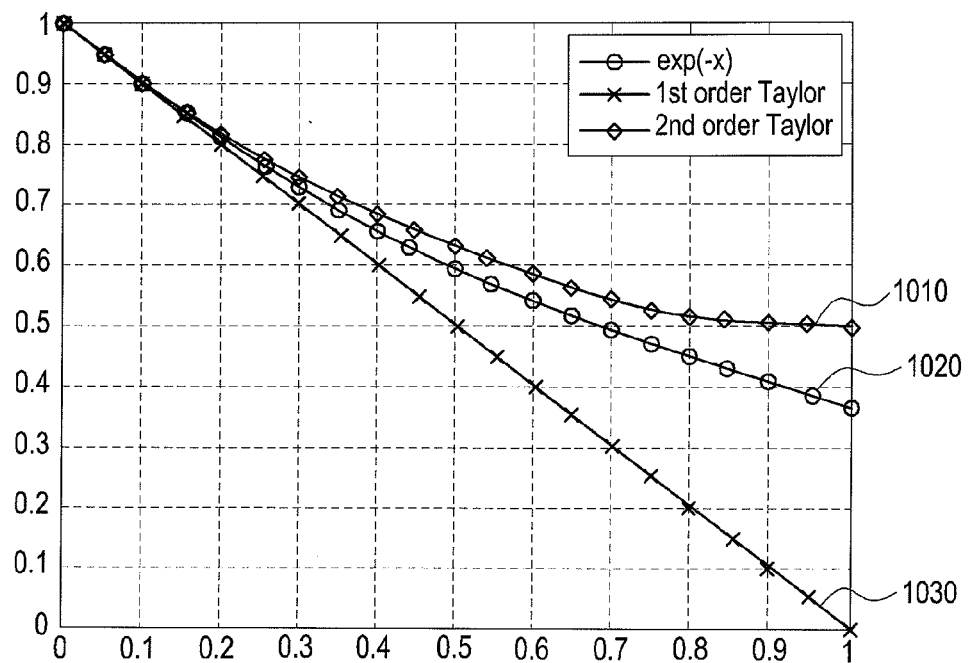
FIG. 10 is a view for describing an approximated result of an exponential function by using Taylor series according to an exemplary embodiment of the present invention.

FIG. 10 is a view for describing an approximated result of an exponential function by using Taylor series according to an exemplary embodiment of the present invention.

Referring to FIG. 10, when an exponential function is approximated, the easiest method is a first-order approximation of the exponential function using Taylor series as shown in FIG. 10, or not to consider a constellation point farthest from the reception signal. In FIG. 10, reference numerals 1010, 1020, and 1030 indicate an actual exponential function, an approximation result using first-order Taylor series, and an approximation result using second-order Taylor series, respectively.

As shown in FIG. 10, referring to simulation results of the above methods, the methods are not operated in a desired way, or produce a markedly bad result in comparison with a case using an actual non-linear MMSE function. Accordingly, the exponential function is divided into sections according to their importance for more accurate approximation of the exponential function, and a method of representing an optimal linear function for each section is proposed in exemplary embodiments of the present invention.

The number of sections and a size of the exponential function are set differently according to a size of a function value of the exponential function in order to minimize an error generated in approximating the exponential function to the linear function. The setting is described below with reference to FIG. 11.

When the linear function is determined from the exponential function having differently set sections, a parallel translation of the linear function, which is determined by a start point and an end point of the actual exponential function in a corresponding section, is properly performed and a finally-approximated linear function is determined. The parallel translation is set to satisfy a condition in which the MSE between the exponential function and the finally approximated linear function is minimized. The parallel translation is determined to satisfy the MMSE. The determination is described below with reference to FIG. 12.

Figure 11:
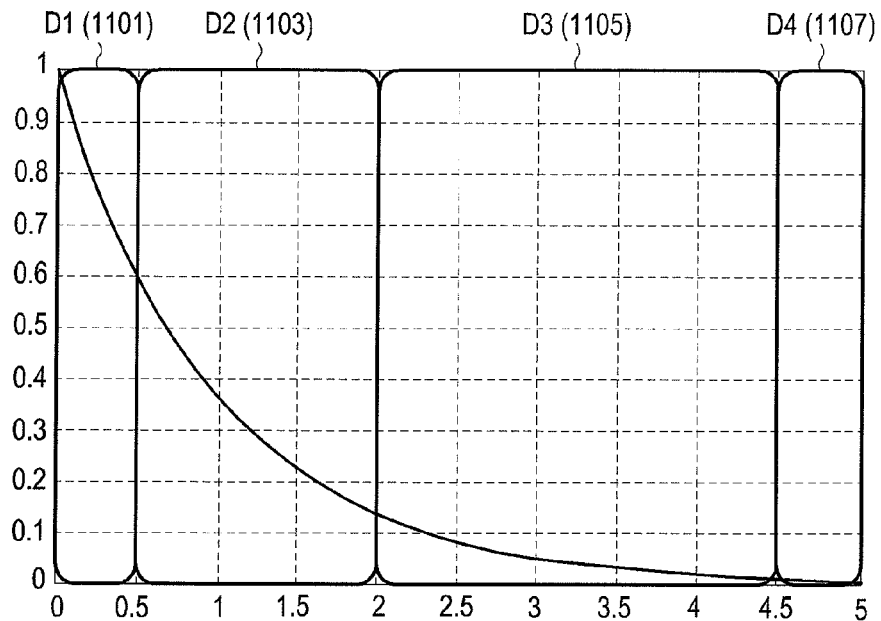
FIG. 11 is a view for describing a method of dividing an exponential function for each section in order to approximate the exponential function to a linear function according to an exemplary embodiment of the present invention.

FIG. 11 is a view for describing a method of dividing an exponential function for each section in order to approximate the exponential function to a linear function according to an exemplary embodiment of the present invention.

Referring to FIG. 11, the exponential function is divided into four sections, that is, D1 1101, D2 1103, D3 1105, and D4 1107. In a first section D1 1101, a width of the section is narrowly set since a size of a function value is large, so that a more accurate approximation expression may be obtained. In a second section D2 1103, a width of the section is relatively larger than that of the section D1 1101 since a function value is smaller than that of D1 1101. Accordingly, where a function value is large, a more accurate function for a result value of the soft slicing according to Equation 15 may be obtained and a more accurate non-linear MMSE value may be finally obtained.

Figure 12:
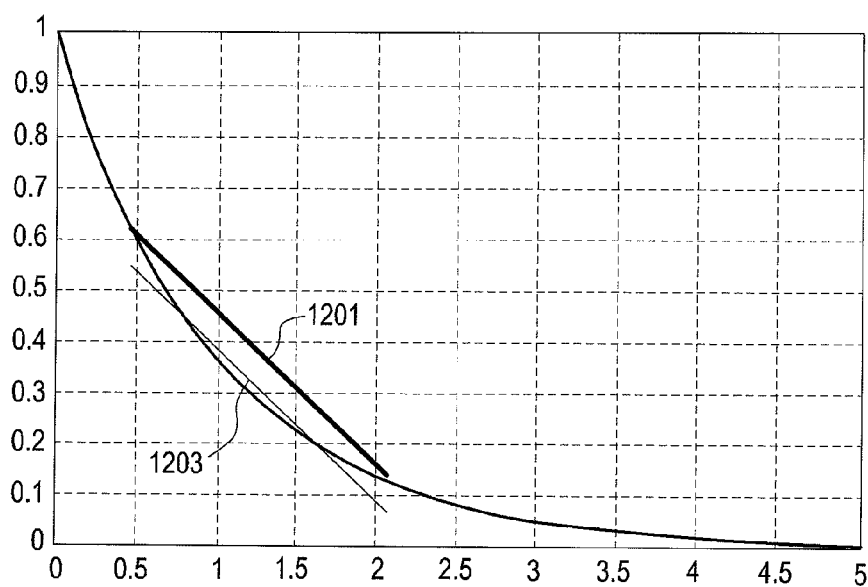
FIG. 12 is a view for describing a process of determining an approximated linear function for an exponential function in a corresponding section according to the first exemplary embodiment of the present invention.

FIG. 12 is a view for describing a process of determining an approximated linear function for an exponential function in a corresponding section according to the first exemplary embodiment of the present invention.

Referring to FIG. 12, a reference numeral 1201 refers to a point mapping for determining a linear function by using a start point and an end point of an actual exponential function in a corresponding section. When the linear function is determined according to the point mapping 1201 method, it can be seen that a large error is generated in remaining parts except a start point and an end point of a corresponding linear function. That causes a result in which a large overall error between the linear function and the exponential function is generated. Accordingly, in exemplary embodiments of the present invention, the linear function determined by the point mapping becomes a linear function satisfying an MMSE condition in order to minimize the error. A reference numeral 1203 indicates that the linear function is determined such that the MMSE condition according to an embodiment of the present invention is satisfied. A process of determining the linear function such that the MMSE condition is satisfied is described below.

If coordinates of a start point and an end point of the exponential function in a certain section are $[x_0, y_0]$ and $[x_1, y_1]$, respectively, a linear function having coordinates $[x_0, y_0]$ and $[x_1, y_1]$ as a start point and an end point is determined by Equation 16.

$$y - y_0 = \left(\frac{y_1 - y_0}{x_1 - x_0}\right)(x - x_0),$$

$$y = \underbrace{\left(\frac{y_1 - y_0}{x_1 - x_0}\right)}_{\alpha} x + \underbrace{\left(y_0 + x_0\left(\frac{y_1 - y_0}{x_1 - x_0}\right)\right)}_{\beta}$$

Equation 16

In the linear function of Equation 16, when a gradient value α and a y-intercept value β are determined such that an error between the linear function and the exponential function is minimized, the error between the linear function and the exponential function may be minimized. According to exemplary embodiments of the present invention, the gradient value α and the y-intercept value β are determined such that a MSE is minimized.

The MSE according to the values α and β is defined by Equations 17 and 18.

$$MSE(\alpha, \beta) = \int_{x_0}^{x_1} (e^{-x} - (\alpha x + \beta))^2 dx \qquad \text{Equation 17}$$

$$= \int_{x_0}^{x_1} e^{-2x} - 2e^{-x}(\alpha x + \beta) +$$
$$(\alpha^2 x^2 + 2\alpha\beta x + \beta^2) dx$$

$$= \int_{x_0}^{x_1} \left( \begin{array}{c} e^{-2x} - 2\alpha e^{-x} x - 2\beta e^{-x} + \\ \alpha^2 x^2 + 2\alpha\beta x + \beta^2 \end{array} \right) dx$$

$$= \underbrace{\left(-\frac{1}{2} e^{-2x} \Big|_{x_0}^{x_1}\right)}_{C_6} + \underbrace{\left(-2 \int_{x_0}^{x_1} x e^{-x} dx\right)}_{C_2} \alpha +$$

$$\underbrace{(-2e^{-x} \big|_{x_0}^{x_1}) \beta}_{C_4} + \underbrace{\left(\frac{1}{2} x^3 \Big|_{x_0}^{x_1}\right) \alpha^2}_{C_1} +$$

$$\underbrace{\left(2\alpha\beta \cdot \frac{1}{2} x^2 \Big|_{x_0}^{x_1}\right) \alpha\beta}_{C_3} + \underbrace{(x_1 - x_0) \beta^2}_{C_5}$$

$$C_1 = \frac{1}{3}(x_1^3 - x_0^3) \qquad \text{Equation 18}$$
$$C_2 = -2[(x_0 + 1)e^{-x_0} - (x_1 + 1)e^{-x_1}]$$
$$C_3 = (x_1^2 - x_0^2)$$
$$C_4 = 2(e^{-x_1} - e^{-x_0})$$
$$C_5 = (x_1 - x_0)$$

Equation 17 is rearranged according to Equation 18 and defined by Equation 19.

$$J(\alpha, \beta) = C_1 \alpha^2 + C_2 \alpha + C_3 \alpha\beta + C_4 \beta^2 + C_5 \qquad \text{Equation 19}$$

Referring to Equation 19, MSE($\alpha$, $\beta$) of Equation 17 is represented by J($\alpha$, $\beta$) for convenience. In order to find J($\alpha$, $\beta$) of Equation 19, that is, values of $\alpha$ and $\beta$ for minimizing MSE($\alpha$, $\beta$), it is only necessary to find values of $\alpha$ and $\beta$ satisfying a condition where both values of partially differentiating $\alpha$ and $\beta$ are "0". The process is defined by Equation 20.

$$\frac{\partial J(\alpha, \beta)}{\partial \alpha} = 2C_1 \alpha + C_2 + C_3 \beta = 0 \qquad \text{Equation 20}$$

$$\frac{\partial J(\alpha, \beta)}{\partial \beta} = C_3 \alpha + C_4 + 2C_5 \beta = 0$$

Equation 20 is defined by Equation 21 through a rearrangement.

$$\begin{bmatrix} \alpha \\ \beta \end{bmatrix} = - \begin{bmatrix} 2C_1 & C_3 \\ C_3 & 2C_5 \end{bmatrix}^{-1} \begin{bmatrix} C_2 \\ C_4 \end{bmatrix} \qquad \text{Equation 21}$$

The values of $\alpha$ and $\beta$ for minimizing J($\alpha$, $\beta$), that is, MSE($\alpha$, $\beta$) may be determined according to Equation 21. Accordingly, a linear function determined according to the determined values of $\alpha$ and $\beta$ becomes a finally approximated linear function for an exponential function in a corresponding section.

An example for approximating an exponential function according to the aforementioned exponential function approximation method will be described. If the exponential function sections are divided into 5 stages, a linear function approximated in each section is defined by Equation 22.

$$y = -0.8839x + 0.9953 \, (0 \leq x < 0.25)$$

$$y = -0.6884x + 0.9472 \, (0.25 \leq x < 0.5).$$

$$y = -0.4753x + 0.8338 \, (0.5 \leq x < 0.75).$$

$$y = -0.2288x + 0.5757 \, (0.75 \leq x < 2).$$

$$y = -0.0549x + 0.2234 \, (2 \leq x < 4).$$

$$y = -0.0036x + 0.0262 \, (4 \leq x < 8). \qquad \text{Equation 22}$$

Referring to Equation 22, since a value of the exponential function decreases when a value of x increases, a length of a corresponding section is lengthened as the value of x is increased. In such divided sections, values of $\alpha$ and $\beta$ for determining a linear function for each exponential function are determined by Equation 21.

A result in which an equalization performance is simulated according to the above description is described below.

The simulation is performed for QPSK, 16-QAM, and 64-QAM in a HSPA 2×2 MIMO system environment. The soft slicing uses linear slicing, non-linear slicing, and approximately Non-Linear (aNL) slicing methods in order to grasp an equalization performance according to the symbol cleaning, that is, the symbol slicing method. The approximately non-linear slicing method divides an exponential function into 16 sections.

As a result of the simulation, when the equalizer proposed according to exemplary embodiments of the present invention is used, a reception gain of about 2 to 3 dB is obtained in comparison with a typical LMMSE equalizer.

When using a QPSK modulation method, a reception signal, in which an interference signal is removed, is equalized according to exemplary embodiments of the present invention, and the performance is improved by about 2.5 dB when the linear function approximation method is used for the soft slicing. An additional gain of 2 dB is obtained when the non-linear slicing method or the approximately non-linear method is used for the soft slicing.

When using a 16-QAM modulation, a reception signal, in which an interference signal is removed, is equalized according to exemplary embodiments of the present invention, and the performance of about 2 dB is improved when the linear function approximation method is used for the soft slicing. An additional gain of 3 dB is obtained when the non-linear slicing method or the approximately non-linear method is used for the soft slicing.

When using a 64-QAM modulation, a reception signal, in which an interference signal is removed, is equalized according to exemplary embodiments of the present invention, and the performance of about 2 dB is improved when the linear function approximation method is used for the soft slicing. An additional gain of 2 dB is obtained when the non-linear slicing method or the approximately non-linear method is used for the soft slicing.

Second Exemplary Embodiment

A second exemplary embodiment of the present invention discussed in the following description separately applies the equalization method using the interference cancellation proposed in the first embodiment to each of an HS channel (HS_PDSCH) signal and a non-HS to further improve the performance.

The "HS channel" refers to an HSDPA data channel (HS-PDSCH) defined after 3GPP Release 7. The HS data channel fixedly uses a value of 16 as a Spreading Factor (SF). QPSK, 16-QAM, and 64-QAM may be used as the modulation method. A precoding method is used for an HS channel in a 2×2 multiple antenna system.

The non-HS channel includes a control channel such as a Pilot Channel (CPICH), a P-CCPCH, and an S-CCPCH, an HS control channel (HS-SCCH), and an R99 Data Channel (DPCH) defined in 3GPP Release 99 (R 99). The non-HS channel does not fixedly use an SF, and uses various SFs from a maximum of 4 to a minimum of 256. In general, the R99 control channel, the R99 data channel, and the HS control channel use an SF of 128. The modulation method fixedly uses QPSK. The precoding is not applied to the non-HS channel in a 2×2 multiple antenna system unlike the HS channel. Instead, a Space-Time Transmit Diversity (STTD) is applied. Accordingly, an STTD encoding is performed in a transmission side, and the STTD encoding process and an STTD re-encoding process are required for restoring a signal on a reception side.

Figure 13:
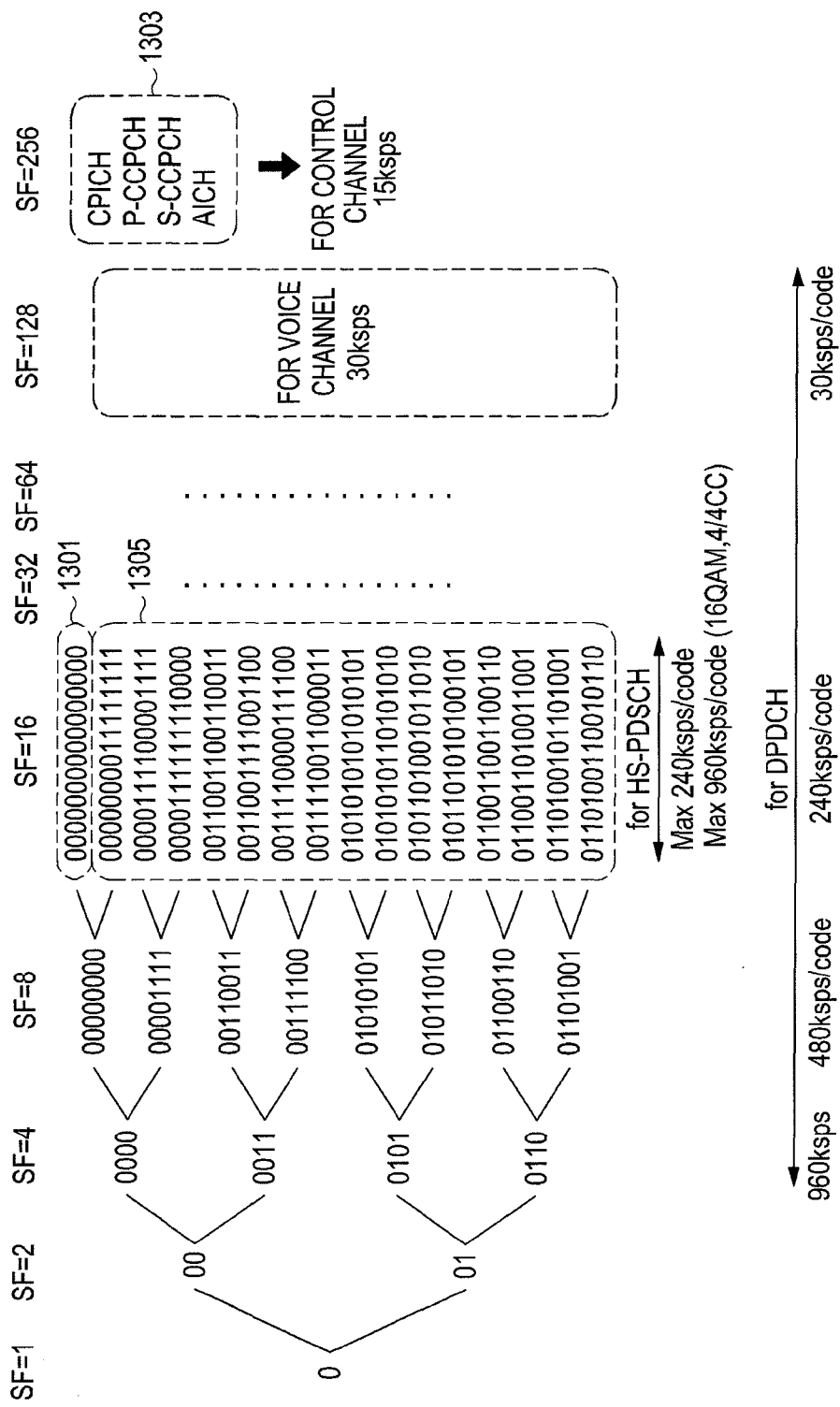
FIG. 13 is a view for describing a tree structure of an Orthogonal Variable Spreading Factor (OVSF) code which is a channelization code of a Wideband Code Division Multiple Access (WCDMA) downlink according to a second exemplary embodiment of the present invention.

FIG. 13 is a view for describing a tree structure of an Orthogonal Variable Spreading Factor (OVSF) code which is a channelization code of a Wideband Code Division Multiple Access (WCDMA) downlink according to a second exemplary embodiment of the present invention.

Referring to FIG. 13, where an SF is "16", when 16 code channels of 16 branches of the OVSF code correspond to Ch #0, . . . , Ch #15, Ch #0 1301 is allocated to a CPICH, a PICH, an AICH, a PCCPCH, and an HS-SCCH 1303.

The remaining 15 channels 1305 may be allocated to the HS channel or the non-HS channel. For example, a current terminal may be a terminal receiving an HS-DSCH channel signal of SF 16. The corresponding terminal is allocated Ch1 to Ch5 among 16 channels of SF 16, and the remaining Ch6 to Ch 15 are allocated to other terminals receiving an R99 data channel signal of SF 128. For reference, in the OVSF code, when a particular code of a higher layer (for example, 0000 of SF 4) is allocated to one user to be used by the user, all codes of a lower layer (for example, 00000000 of SF 8, 0000 of SF 64, and 0000) of a tree branched from the corresponding code cannot be used anymore, because orthogonality is not maintained between a particular code of a higher layer of a tree structure of the OVSF code and a code of a lower layer branched from the corresponding code. Similarly, when a code of a lower layer is first used, all codes of a higher layer of the code cannot be used.

As described above, when an HS channel signal is received using SF 16, not all code channels are allocated to the HS channel using SF 16. However, the first exemplary embodiment shows optimal performance when all code channels are constructed by the HS channel. Accordingly, when the code channels include both the HS channel signal and the non-HS channel signal, the second exemplary embodiment of the present invention determines a channel signal of the corresponding code channels. When the code channel is the HS channel, interference is removed in a function block constructed to process the HS signal. When the code channel is the non-HS channel, the interference is removed in a function block constructed to process the non-HS signal.

Figure 14:
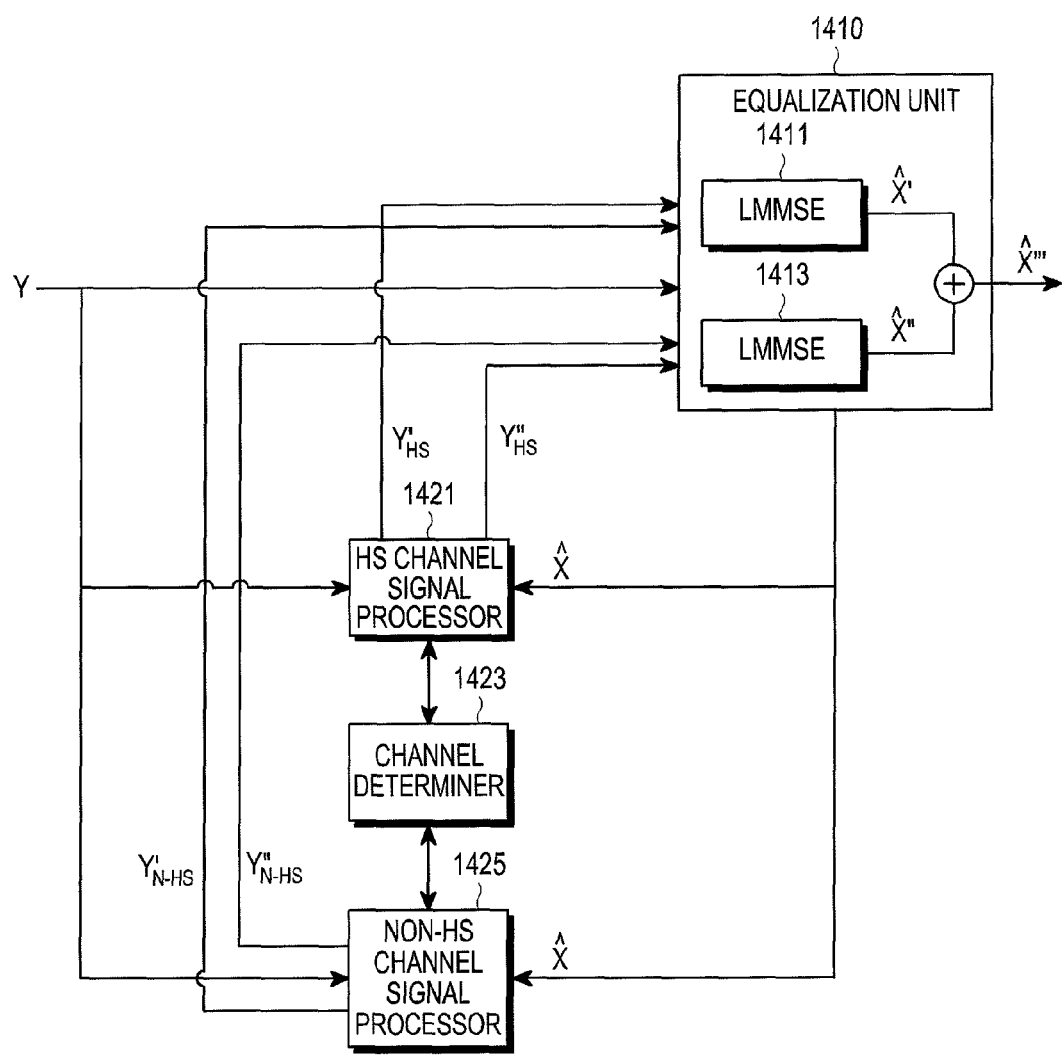
FIG. 14 is a view for describing a construction of an LMMSE equalizer in a receiver of a 2×2 MIMO transmission/reception system according to the second exemplary embodiment of the present invention.

FIG. 14 is a view for describing a construction of an LMMSE equalizer in a receiver of a 2×2 MIMO transmission/reception system according to the second exemplary embodiment of the present invention.

Referring to FIG. 14, an equalizer construction according to the first exemplary embodiment described in FIG. 5 is modified. Comparing the equalizer of FIG. 14 with the equalizer of FIG. 5, the interference cancellation signal generator 520 processes all HS channel signals since the first exemplary embodiment is based on an assumption that the HS channel is processed. However, in the second exemplary embodiment, the HS channel signal and the non-HS channel signal are processed in separate blocks. An HS channel signal processor 1421 processes the HS channel signal, and a non-HS signal processor 1425 processes the non-HS channel signal.

A channel determiner 1423 determines whether a corresponding signal is the HS channel signal or the non-HS channel signal according to the method proposed in the present invention by using a symbol transferred from the HS channel signal processor 1421 and a symbol transferred from the non-HS channel signal processor 1425.

A reception signal Y is input to an equalization unit 1410 and equalized in a first LMMSE 1411 or a second LMMSE 1413 included in the equalization unit 1410. An estimated transmission signal $\hat{X}$ is transferred to each of the HS channel signal processor 1421 and the non-HS channel signal processor 1425.

The HS channel signal processor 1421 generates a symbol using SF 16 based on an assumption that the estimated transmission signal $\hat{X}$ is transmitted using SF 16. The non-HS channel signal processor 1425 generates a symbol using SF 128 based on an assumption that the estimated transmission signal $\hat{X}$ is transmitted using SF 128. Each of the generated symbols is transferred to the channel determiner 1423.

The channel determiner 1423 determines whether each code of SF 16 is allocated to the HS channel data using SF 16 or each code of SF 16 is allocated to the non-HS channel data using SF 128 according to a method, which will be described later. When the channel is determined, channel information for each code determined according to the determined channel is transferred to the HS channel signal processor 1421 or the non-HS channel signal processor 1425. When Ch1 is the HS channel, and Ch2 is the non-HS channel, the information is transferred to each of the HS channel signal processor 1421 and the non-HS channel signal processor 1425.

The HS channel signal processor 1421 and the non-HS channel signal processor 1425 generate signals, in which interference is removed, for each code, which they should process according to the transferred channel information for each code.

The HS channel signal processor 1421 generates signals $Y_{HS'}$ and $Y_{HS''}$ for each code. The generated signals $Y_{HS'}$ and $Y_{HS''}$ are input to the first LMMSE 1411 and the second LMMSE 1413 and independently equalized, respectively. As a result, $\hat{X}'$ and $\hat{X}''$ are output. $\hat{X}'$ and $\hat{X}''$ are linearly added in an adder 1415, and $\hat{X}'''$ is output. The non-HS channel signal processor 1425 generates signals $Y_{N-HS}'$ and $Y_{N-HS}''$ in the same way. Accordingly, the estimated transmission signal $\hat{X}'''$ in which an interference is removed for each code is output. The signals are all added and a signal transmitted from a transmission side, that is, a base station, is finally estimated.

Figure 15:
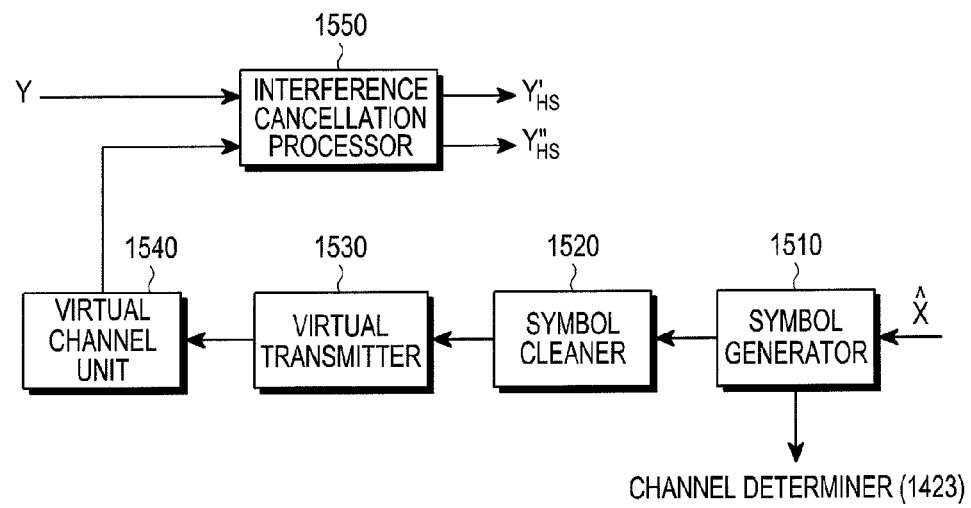
FIG. 15 is a view for describing a construction of an HS channel signal processor according to the second exemplary embodiment of the present invention.

FIG. 15 is a view for describing a construction of an HS channel signal processor according to the second exemplary embodiment of the present invention.

Referring to FIG. 15, the construction of the HS channel signal processor 1421 is substantially the same as that of FIG. 6. The HS channel signal processor 1421 includes a symbol generator 1510, a symbol cleaner 1520, a virtual transmitter 1530, a virtual channel unit 1540, and an interference cancellation processor 1550.

The symbol generator 1510 generates a symbol from the estimated transmission signal $\hat{X}$ transferred from the equalization unit 1410. The symbol generator 1510 applies an inverse process of the signal processing procedure of the HS transmitter to $\hat{X}$ in order to generate a symbol. That is, after multiplying $\hat{X}$ and an inverse precoding matrix, the symbol generator 1510 performs inverse scrambling and inverse spreading to generate the symbol. For example, the inverse spreading may be performed through an inverse Hadamard conversion, and the inverse scrambling may be performed by multiplying a PN code.

The symbol generated in the symbol generator 1510 is transferred to the symbol cleaner 1520 and the channel determiner 1423. When a signal of a corresponding code channel is determined according to a method which will be described below, the generated symbol is transferred to the symbol cleaner 1520 again.

The symbol cleaner 1520 performs a symbol cleaning for the generated symbol, so that a more reliable symbol may be generated in comparison with the symbol generated in the symbol generator 1510. The symbol cleaning method is the same as that described above with reference to FIG. 9.

The virtual transmitter 1530 applies the signal processing procedure of the transmitter of FIG. 1 to the symbol in which the cleaning is performed. After the spreading and the scrambling are performed for the symbol, a precoding matrix is multiplied. For example, the spreading may be performed through an inverse Hadamard conversion, and the scrambling may be performed by multiplying a PN code.

The virtual channel unit 1540 multiplies an output signal of the virtual transmitter 1530 and a channel function in order to enable the output signal of the virtual transmitter 1530 to experience a channel H between the transmitter 200 and the receiver 210. If the signal is processed in a time domain, a convolution of the channel function will be performed.

The interference cancellation processor 1550 outputs Y', $Y_{HS}'$, and $Y_{HS}''$ from the reception signal Y using the output signal of the virtual channel unit 1540, and generates reception signals having a high reliability in which a mutual interference between transmission signals is removed. $Y_{HS}'$ and $Y_{HS}''$ are input to the equalization unit 1410 of FIG. 14, independently equalized, linearly added, and $\hat{X}'''$ is generated.

Figure 16:
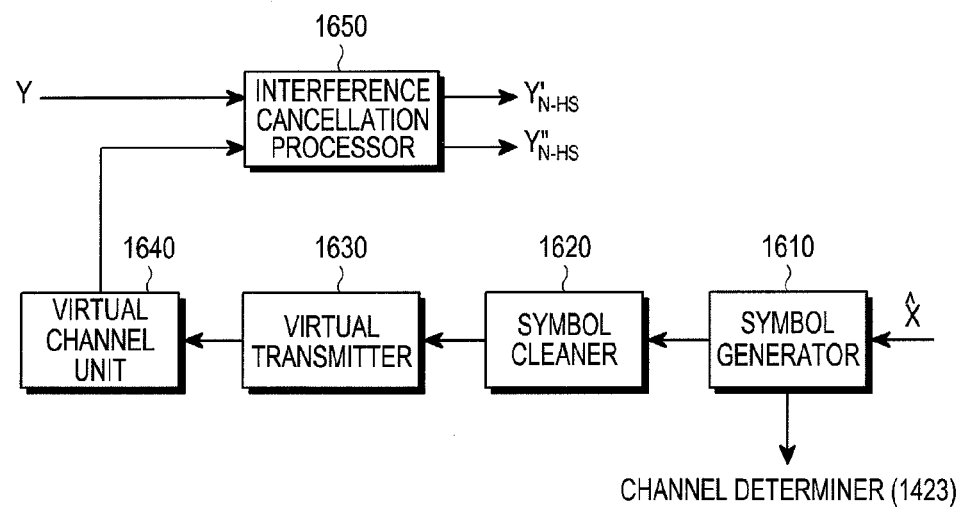
FIG. 16 is a view for describing a construction of a non-HS channel signal processor according to the second exemplary embodiment of the present invention.

FIG. 16 is a view for describing a construction of a non-HS channel signal processor according to the second exemplary embodiment of the present invention.

Referring to FIG. 16, the non-HS channel signal processor 1425 includes a symbol generator 1610, a symbol cleaner 1620, a virtual transmitter 1630, a virtual channel unit 1640, and an interference cancellation processor 1650. The elements perform nearly the same operations as those of elements described in FIG. 15, and a description of the similar operations is omitted.

However, there is a difference only in that the symbol generator 1510 of FIG. 15 multiplies the inverse precoding matrix, and performs the inverse scrambling and the inverse spreading, but the symbol generator 1610 of FIG. 16 performs an STTD decoding, the inverse scrambling, and the inverse spreading.

The reason why the difference is generated is that the precoding is not performed for the non-HS channel (R99 data channel) data in the transmitter of the multiple antenna system but the STTD encoding is performed as described above, and accordingly the STTD decoding, instead of the inverse precoding, is performed in the receiver. In the STTD decoding, since the non-HS channel uses SF 128 under an HSPS-MIMO system, it is possible to detect the non-HS channel signals by using SF 128. Since the pilot channel is STTD-encoded based on SF 256, SF 256 should be used in the STTD decoding.

The virtual transmitter 1530 of FIG. 15 performs the spreading and scrambling for the symbol, and multiplies the precoding matrix, but the virtual transmitter 1630 of FIG. 16 performs the STTD encoding after the spreading and the scrambling since the virtual transmitter 1630 processes the non-HS channel signal.

An exemplary method of determining a channel in the channel determiner 1423 is described below.

In the second exemplary embodiment of the present invention, a hypothesis testing is performed. A first assumption corresponds to a case where the transmitter transmits the HS channel (HS-PDSCH) data using a corresponding code, and a second assumption corresponds to a case where the transmitter transmits the non-HS channel data (for example, DPCH of SF 128) using a corresponding code.

Hypothesis 1

In <Hypothesis 1>, it is assumed that the transmitter transmits the HS channel data using an OVSF code of SF 16. A reception symbol of the HS channel data of SF 16 is generated by multiplying a gain g and a symbol s and adding a noise v. The reception symbol is defined by Equation 23.

$$r = gs + v \qquad \text{Equation 23}$$

For the <Hypothesis 1>, when a signal is received by using the OVSF code of SF 16, power of a restoration symbol is calculated as shown below.

A value z generated by multiplying the signal of Equation 23 and a corresponding OVSF code of SF 16 is defined by Equation 24.

$$z = gs + \frac{1}{\sqrt{N}} v \qquad \text{Equation 24}$$

Referring to Equation 24, N denotes a value of the SF, and N=16. A square mean of signal z of Equation 24 is defined by Equation 25 below.

$$E|z|^2 = g^2 + \frac{1}{N} \sigma_v^2 \qquad \text{Equation 25}$$

Referring to Equation 25, $\sigma_v^2$ refers to a variance of noise v.

For the <Hypothesis 1>, when a signal is received by using the OVSF code of SF 128, power of a restoration symbol is calculated as shown below.

The total number of codes of SF 128 branched from on code of SF 16 is "8". Accordingly, it is considered that total symbols generated by adding all 8 symbols. A signal z generated by multiplying the signal of Equation 23 and each of 8 OVSF codes of SF 128 and adding them is defined by Equation 26.

$$Z = \frac{g}{N_1} \sum_{i=0}^{(N_1-1)} S_i + \frac{1}{\sqrt{N_2}} v \qquad \text{Equation 26}$$

A square mean of the signal z of Equation 26 is defined by Equation 27 below.

$$E(|z|^2) = \frac{g^2}{N_1} + \frac{1}{N_2} \sigma_v^2 \qquad \text{Equation 27}$$

Referring to Equation 27, $N_1 = 128/16 = 8$ and $N2 = 128$.

A sum of 8 different (a mean is "0") symbols Si may be approximated to a single Gaussian random variable having a mean of "0" according to Law of large numbers, and it is defined by Equation 28.

$$Z \approx w \quad \text{Equation 28}$$

Equation 28 has a distribution of a Gaussian random variable as defined by Equation 29.

$$w \sim N\left(0, \frac{g^2}{N_1} + \frac{\sigma^2}{N_2}\right) \quad \text{Equation 29}$$

Comparing two cases for the <Hypothesis 1>, Equation 25 indicating a square mean value of z where the transmission side transmits a signal by using SF 128 and the reception side uses SF 16, with Equation 27 indicating a square mean value of z where the transmission side transmits a signal using SF 128 and the reception side uses SF 128, the square mean value (i.e. power value) of a restored signal z using SF 128 is smaller than the square mean value using SF 16. A ratio of the square mean value using SF 128 to the square mean value using SF 16 is approximately a reciprocal (16/128=1/8) of an SF ratio.

Hypothesis 2

In <Hypothesis 2>, it is assumed that the transmitter transmits the HS channel (DPCH) data using an OVSF code of SF 128. A reception symbol of the HS channel data of SF 128 is generated by multiplying a gain g and a symbol s and adding a noise v. The reception symbol is defined by Equation 30.

$$r = gs + v \quad \text{Equation 30}$$

For the <Hypothesis 2>, when a signal is received using the OVSF code of SF 128, power of a restoration symbol is calculated as shown below.

A value z generated by multiplying the signal of Equation 30 and a corresponding OVSF code of SF 16 is defined by Equation 31.

$$z = gs + \frac{1}{\sqrt{N}} v \quad \text{Equation 31}$$

Referring to Equation 31, N=128. A square mean of signal z of Equation 31 is defined by Equation 32 below.

$$E|z|^2 = g^2 + \frac{1}{N} \sigma_v^2 \quad \text{Equation 32}$$

For the <Hypothesis 2>, when a signal is received using the OVSF code of SF 16, power of a restoration symbol is calculated as shown below.

A value z generated by multiplying the corresponding OVSF code of SF 16 for the symbol is defined by Equation 33.

$$z = gs + \frac{1}{\sqrt{N_1}} v \quad \text{Equation 33}$$

Referring to Equation 33, $N_1$ denotes a value of SF, and corresponds to "16". A square mean of the signal z of Equation 33 is defined by Equation 34.

$$E|z|^2 = g^2 + \frac{1}{N_1} \sigma_v^2 \quad \text{Equation 34}$$

Comparing two cases for the <Hypothesis 2>, Equation 32 indicating a square mean value of z where the transmission side transmits a signal using SF 128 and the reception side uses SF 128, with Equation 34 indicating a square mean value of z where the transmission side transmits a signal using SF 16 and the reception side uses, noise power of a restored signal z using SF 128 is smaller than noise power using SF 16.

Results of the <Hypothesis 1> and the <Hypothesis 2> may be used as described below.

When the transmission side actually transmits a corresponding channel using SF 16, a ratio r of signal power obtained using SF 16 to signal power obtained using SF 128 by the reception side is defined by Equation 35 below.

$$r = \frac{E_{SF16}(|z|^2)}{E_{SF128}(|z|^2)} \quad \text{Equation 35}$$

$$= \frac{g^2 = \frac{1}{16}\sigma_v^2}{\frac{g^2}{8} + \frac{1}{128}\sigma_v^2}$$

$$= \frac{8\left(1 + \frac{\sigma_v^2}{2g^2}\right)}{\left(1 + \frac{\sigma_v^2}{16g^2}\right)} (SF16 - \text{true})$$

Referring to Equation 35, a value of r is larger than a value of 8. When signal power becomes larger than noise power, the value of r may be approximated to the value of 8.

When the transmission side actually transmits a corresponding channel using SF 128, a ratio r of signal power obtained using SF 16 to signal power obtained using SF 128 by the reception side is defined by Equation 36 below.

$$r = \frac{E_{SF16}(|z|^2)}{E_{SF128}(|z|^2)} \quad \text{Equation 36}$$

$$= \frac{g^2 + \frac{1}{16}\sigma_v^2}{g^2 + \frac{1}{128}\sigma_v^2}$$

$$= \frac{\left(1 + \frac{\sigma_v^2}{16g^2}\right)}{\left(1 + \frac{\sigma_v^2}{128g^2}\right)} (SF128 - \text{true})$$

Referring to Equation 36, a value of r is slightly larger than a value of 1. When signal power is larger than noise power, the value of r may be approximated to the value of 1. The value of r is slightly larger than the value of 1, and the value of r may be approximated to the value of 1 when a signal square is larger than noise power.

A method is described below of determining whether the channel in the second exemplary embodiment of the present invention is a channel using SF 16 or SF 128 according to the above description.

A sum of power of signals received using a corresponding SF 16 code in each SF 16 branch is compared with a sum of power of 8 signals received using 8 codes of SF 128 branched from the corresponding SF 16 branch. When a result of the comparison is larger than a predetermined reference value, a corresponding channel is determined as the HS channel because the corresponding channel is a channel (i.e. HS channel) signal transmitted using SF 16. When the result of the comparison is not larger than a predetermined reference value, the corresponding channel is determined as a channel (i.e. R99 channel) transmitted using SF 128.

The aforementioned hypothesis testing is defined by Equation 37.

$$r = \frac{E_{SF16}(|z|^2)}{\max(E_{SF128}(|z|^2))} > \tau \rightarrow SF16$$

$$r = \frac{E_{SF16}(|z|^2)}{\max(E_{SF128}(|z|^2))} < \tau \rightarrow SF128$$

Equation 37

Referring to Equation 37, a value of $\tau$ may be properly selected in a range of 1 to 8 according to a system setting. Whether a corresponding channel is the HS channel or the non-HS channel for 16 code channels except Ch 0 among 16 channels of SF 16 is determined according to a result of Equation 37.

When the HS channel or the non-HS channel is determined for each code channel, an operation after the symbol generation is performed in a block corresponding to the determined channel.

For example, when a Ch1 code channel is determined as the HS channel and a Ch2 code channel is determined as the non-HS channel, the HS signal processor 1421 performs an operation of a series of blocks (i.e. the symbol cleaning 1520, the virtual transmitter 1530, the virtual channel unit 1540, and the interference cancellation processor 1550) after the symbol generation for a signal of the Ch1 code channel, estimates signals YHS' and YHS" in which an interference is removed for the code channel signal, and outputs the estimated signals. The non-HS signal processor 1425 outputs a value of 0 for the Ch1 code channel. The non-HS signal processor 1425 performs an operation of a series of blocks (i.e. the symbol cleaning 1620, the virtual transmitter 1630, the virtual channel unit 1640, and the interference cancellation processor 1650) after the symbol generation for a signal of the Ch2 code channel, estimates signals YN-HS' and YN-HS" in which an interference is removed for the code channel signal, and outputs the estimated signals. The HS signal processor 1421 outputs a value of 0 for the Ch2 code channel.

A channel for each code channel is determined in the way described above, a signal in which interference is removed according to a method of removing the interference of a corresponding code channel signal in a signal processing block corresponding to the determined channel is generated, and the reception side estimates a transmission signal of the transmission side.

Figure 17:
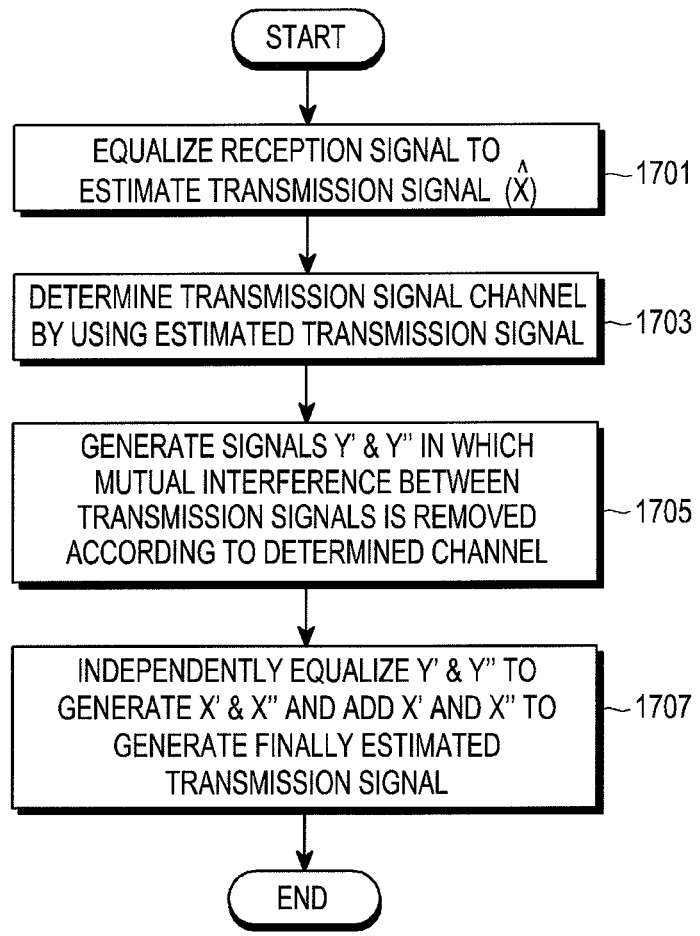
FIG. 17 is a view for describing an equalization method according to the second exemplary embodiment of the present invention.

FIG. 17 is a view for describing an equalization method according to the second exemplary embodiment of the present invention.

Referring to step 1701, a reception signal is equalized and thus a transmission signal is estimated. In step 1703, a channel of the transmission signal is determined using the estimated reception signal. In step 1705, signals in which a mutual interference between transmission signals is removed are generated using a separate signal processor according to properties of the determined channel. In step 1707, the signals in which the interference is removed are independently equalized and equalized result values are added, which generates a finally estimated transmission signal.

Figure 18:
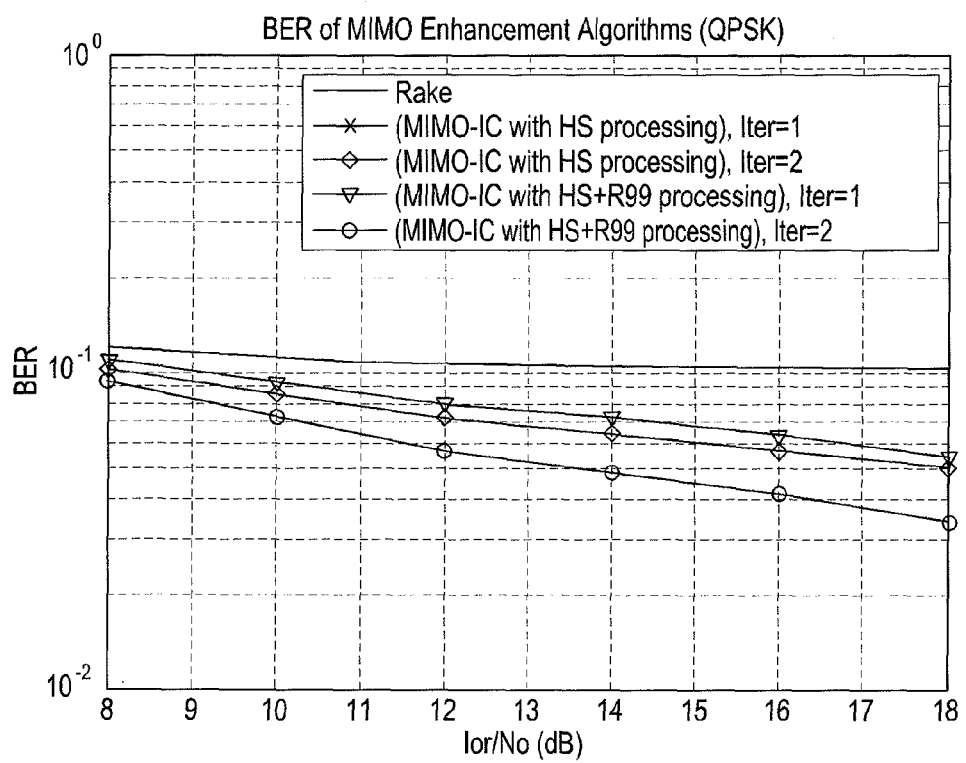
FIG. 18 is a view illustrating a simulation result according to embodiment of the present invention.

FIG. 18 is a view illustrating a simulation result according to the second exemplary embodiment of the present invention.

Referring to FIG. 18, the simulation result is represented by Table 1.

TABLE 1

| Simulation parameter | Setup |
|---|---|
| Transmission antenna/Reception antenna | 2/2 |
| Channel model | Block fading model (6-tap spaced channel) |
| Channel | Use estimated-H |
| Code-channel (HS-PDSCH) Gain | Use estimated-G |
| The number of HS users per stream | 15 users (max) |
| R99 setup | CPICH: −10 dB |
| | PCCPCH: −12 dB |
| | HS-PDSCH (total): −2 dB |
| | OVNS: −6.86 dB |
| Others | Refer to HSPA+ standard for detailed matters |

As described above, the first exemplary embodiment corresponds to a method including only an HS-channel signal processing, and the second exemplary embodiment corresponds to a method including both the HS channel signal and the non-HS channel signal. Table 1 compares experimental results according to the second exemplary embodiment. As shown in FIG. 18, a result of a second iteration of the second exemplary embodiment has been further improved over a result of a second iteration of the first exemplary embodiment by more than 2 dB in terms of performance.

In the second exemplary embodiment, when the HS channel data and the non-HS channel data, that is, R99 channel data and control channel data are used, an inter-stream interference may be effectively removed since the R99 channel data and the control channel data may be simultaneously restored, so that reception performance may be greatly improved.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of removing a mutual interference between transmission signals in a Multiple Input Multiple Output (MIMO) wireless communication system, the method comprising:
   equalizing reception signals received through two or more reception antennas to estimate transmission signals transmitted through two or more transmission antennas;
   generating two or more reception signals in which a mutual interference between the transmission signals is removed from the reception signals by using the estimated transmission signals;
   independently equalizing the generated two or more reception signals; and
   combining the independently equalized two or more reception signals to estimate a transmission signal in which an interference is removed.

2. The method as claimed in claim 1, wherein generating of the two or more reception signals in which the mutual interference between the transmission signals is removed comprises:

applying an inverse procedure of a signal processing used in a transmitter to each of the estimated transmission signals to generate symbols;

cleaning the generated symbols;

applying a transmission procedure identical to that used in the transmitter to the cleaned symbols;

applying a channel between the transmission antennas and the reception antennas to the symbols to which the transmission procedure is applied; and generating two or more reception signals in which an interference is removed from the reception signals by using the symbols to which the channel is applied.

3. The method as claimed in claim 2, wherein, in cleaning of the generated symbols, the generated symbols are cleaned using a non linear MMSE (Minimize Mean Square Error) scheme, and an exponential function used in the non linear MMSE scheme is approximated to a first-order linear function.

4. The method as claimed in claim 3, wherein, when the exponential function is approximated to the first-order linear function, the exponential function is divided into a plurality of sections in such a manner that a length of a section having a larger value of the exponential function is set to be shorter than a length of a section having a smaller value of the exponential function, and a first-order linear function, which makes a Mean Square Error (MSE) value between the exponential function and the first-order linear function have a smallest value, is determined as the approximated first-order linear function in each of the divided sections.

5. The method as claimed in claim 2, wherein, in applying of the transmission procedure, the cleaned symbols are spread, scrambling is performed, and a precoding matrix is multiplied.

6. The method as claimed in claim 1, wherein, in generating of the two or more reception signals in which the interference is removed, the two or more reception signals in which the interference is removed are generated in such a manner that a number of reception antennas is identical to a number of reception signals.

7. The method as claimed in claim 1, further comprising, after estimating of the transmission signals, determining an SF (Spreading Factor), which a channel used for each of the estimated transmission signals has, wherein generating of the two or more reception signals in which the interference is removed comprises applying a corresponding SF to each of the estimated transmission signals according to a result of the determination to generate the two or more reception signals in which the interference is removed.

8. The method as claimed in claim 7, wherein the determining of the SF comprises:

comparing a ratio of a power value of a symbol generated by applying a first SF to each of the estimated transmission signals to a power value of a symbol generated by applying a second SF to each of the estimated transmission signals with a predetermined reference value; and as a result of the comparison, determining that the transmission signal is received through a first channel when the ratio is larger than the reference value, and the transmission signal is received through a second channel when the ratio is equal to or smaller than the reference value.

9. The method as claimed in claim 7, wherein the channel comprises an HSDPA channel and a non-HSDPA channel.

10. The method as claimed in claim 8, wherein the first SF has a value of 16, and the first channel corresponds to the HSDPA channel.

11. The method as claimed in claim 8, wherein the second SF has a value of 128, and the first channel corresponds to an R99 data channel.

12. The method as claimed in claim 7, wherein generating of the two or more reception signals in which the interference is removed comprises:

applying an inverse procedure of a signal processing used in a transmitter to each of transmission signals using channels having different SFs to generate symbols;

cleaning the generated symbols;

applying a transmission procedure identical to that used in the transmitter to the cleaned symbols;

applying a channel between the transmission antennas and the reception antennas to the symbols to which the transmission procedure is applied; and generating two or more reception signals in which an interference is removed from the reception signals by using the symbols to which the channel is applied.

13. An apparatus for removing a mutual interference between transmission signals in a Multiple Input Multiple Output (MIMO) wireless communication system, the apparatus comprising:

an equalization unit for equalizing reception signals received through two or more reception antennas to estimate transmission signals; and an interference cancellation signal generator for generating two or more reception signals in which a mutual interference between transmission signals is removed from the reception signals by using the estimated transmission signals, wherein the equalization unit independently equalizes the two or more reception signals and combines the independently equalized two or more reception signals to estimate a transmission signal in which an interference is removed.

14. The apparatus as claimed in claim 13, wherein the interference cancellation signal generator comprises:

a symbol generator for applying an inverse procedure of a signal processing used in a transmitter to each of the estimated transmission signals to generate symbols;

a symbol cleaner for cleaning the generated symbols;

a virtual transmitter for applying a transmission procedure identical to that used in the transmitter to the cleaned symbols;

a virtual channel unit for applying a channel between the transmission antennas and the reception antennas to the symbols to which the transmission procedure is applied; and an interference cancellation processor for generating two or more reception signals in which an interference is removed from the reception signals by using the symbols to which the channel is applied.

15. The apparatus as claimed in claim 14, the symbol cleaner cleans a symbol by using a non linear MMSE (Minimize Mean Square Error) scheme, and approximates an exponential function used in the non linear MMSE scheme to a first-order linear function.

16. The apparatus as claimed in claim 14, wherein, when the symbol cleaner approximates the exponential function to the first-order linear function, the symbol cleaner divides the exponential function into a plurality of sections in such a manner that a length of a section having a larger value of the exponential function is set to be shorter than a length of a section having a smaller value of the exponential function, and determines a first-order linear function, which makes a Mean Square Error (MSE) value between the exponential function and the first-order linear function have a smallest value as the approximated first-order linear function in each of the divided sections.

17. The apparatus as claimed in claim 14, wherein the virtual transmitter spreads the cleaned symbols, performs scrambling, and multiplies a precoding matrix.

18. The apparatus as claimed in claim 13, wherein the interference cancellation signal generator generates the two or more reception signals in which the interference is removed in such a manner that a number of reception antennas is identical to a number of reception signals.

19. The apparatus as claimed in claim 13, further comprising:
   a channel determiner for determining an SF (Spreading Factor), which a channel used for each of the transmission signals estimated in the equalization unit has; and
   a channel signal processor for applying a corresponding SF to each of the estimated transmission signals according to a result of the determination of the channel determiner to generate the two or more reception signals in which the interference is removed.

20. The apparatus as claimed in claim 19, wherein the channel determiner compares a ratio of a power value of a symbol generated by applying a first SF to each of the estimated transmission signals to a power value of a symbol generated by applying a second SF to each of the estimated transmission signals with a predetermined reference value, and, as a result of the comparison, determines that the transmission signal is received through a first channel when the ratio is larger than the reference value, and that the transmission signal is received through a second channel when the ratio is equal to or smaller than the reference value.

21. The apparatus as claimed in claim 19, wherein the channel comprises an HS channel and a non-HS channel.

22. The apparatus as claimed in claim 20, wherein the first SF has a value of 16, and the first channel corresponds to an HSDPA channel.

23. The apparatus as claimed in claim 20, wherein the second SF has a value of 128, and the first channel corresponds to an R99 data channel.

24. The apparatus as claimed in claim 20, wherein the channel signal processor comprises:
   a symbol generator for applying an inverse procedure of a signal processing used in a transmitter to each of transmission signals using a channel having different SFs to generate symbols;
   a symbol cleaner for cleaning the generated symbols;
   a virtual transmitter for applying a transmission procedure identical to that used in the transmitter to the cleaned symbols;
   a virtual channel unit for applying a channel between the transmission antennas and the reception antennas to the symbols to which the transmission procedure is applied; and
   an interference cancellation processor for generating two or more reception signals in which an interference is removed from the reception signals by using the symbols to which the channel is applied.

* * * * *